Sept. 14, 1965     G. A. BENO     3,205,781
AUTOMATIC PICK-FEED ATTACHMENT
Filed March 12, 1962     4 Sheets-Sheet 1
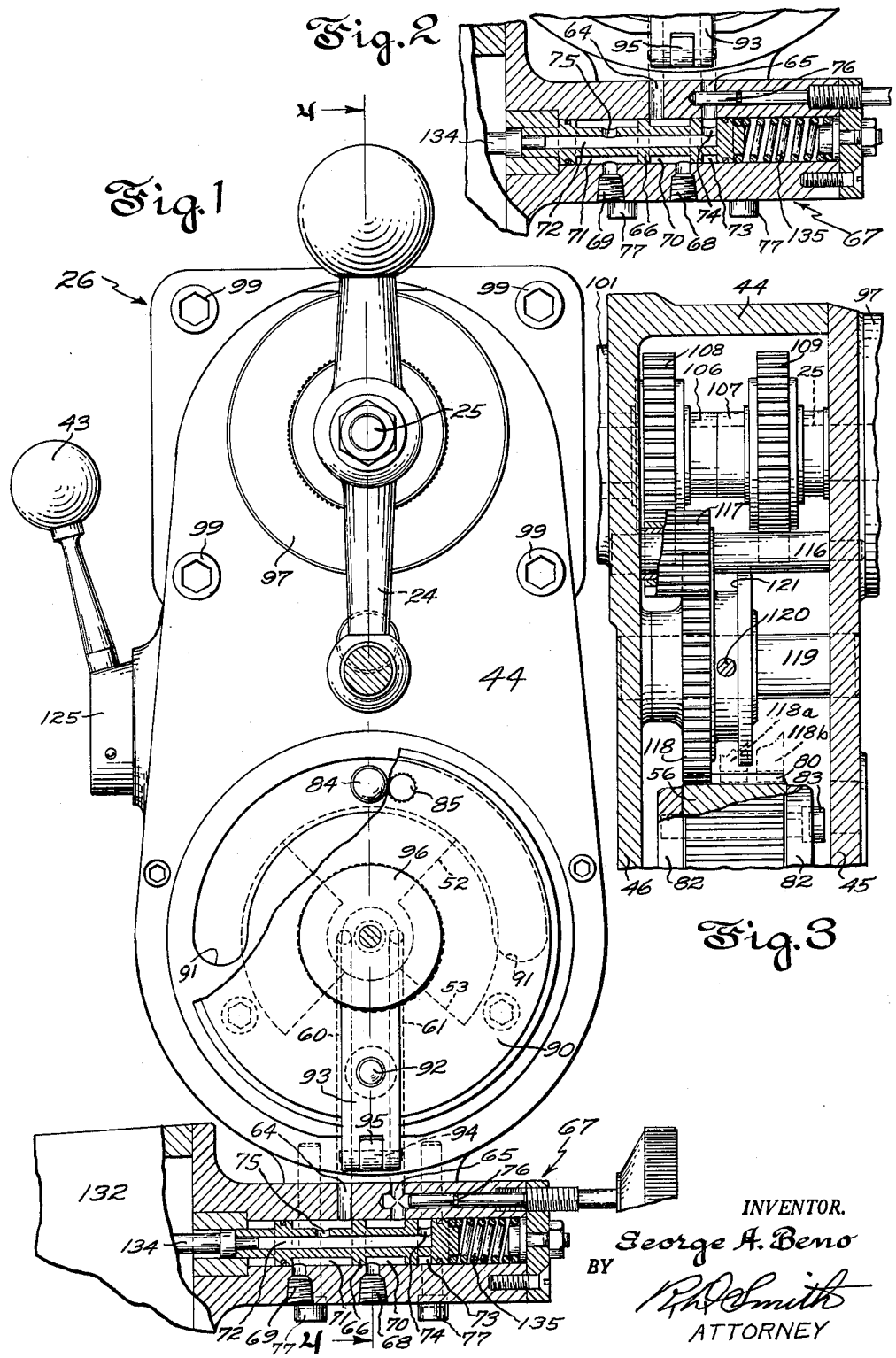
INVENTOR.
George A. Beno
BY
R. P. Smith
ATTORNEY

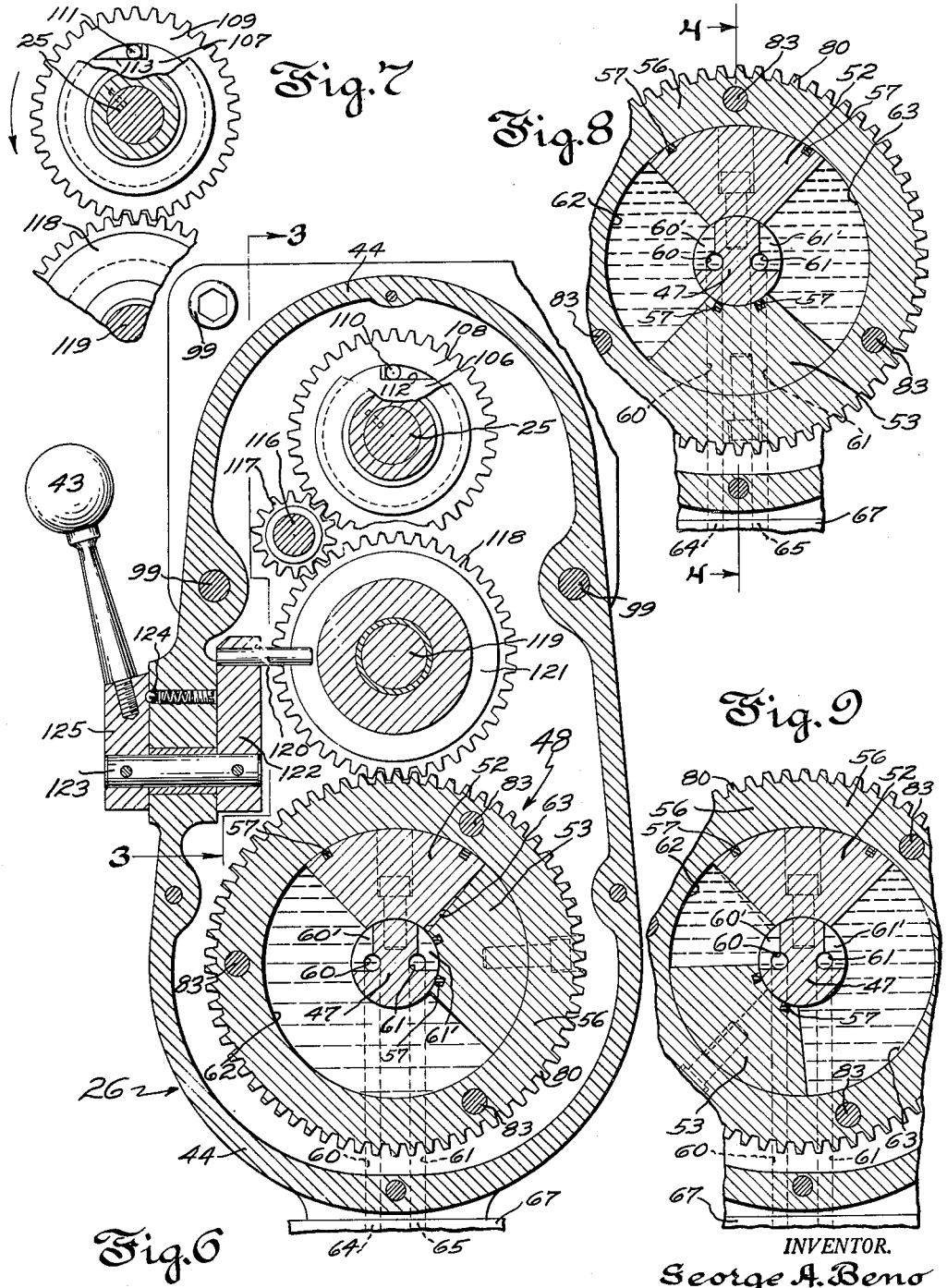

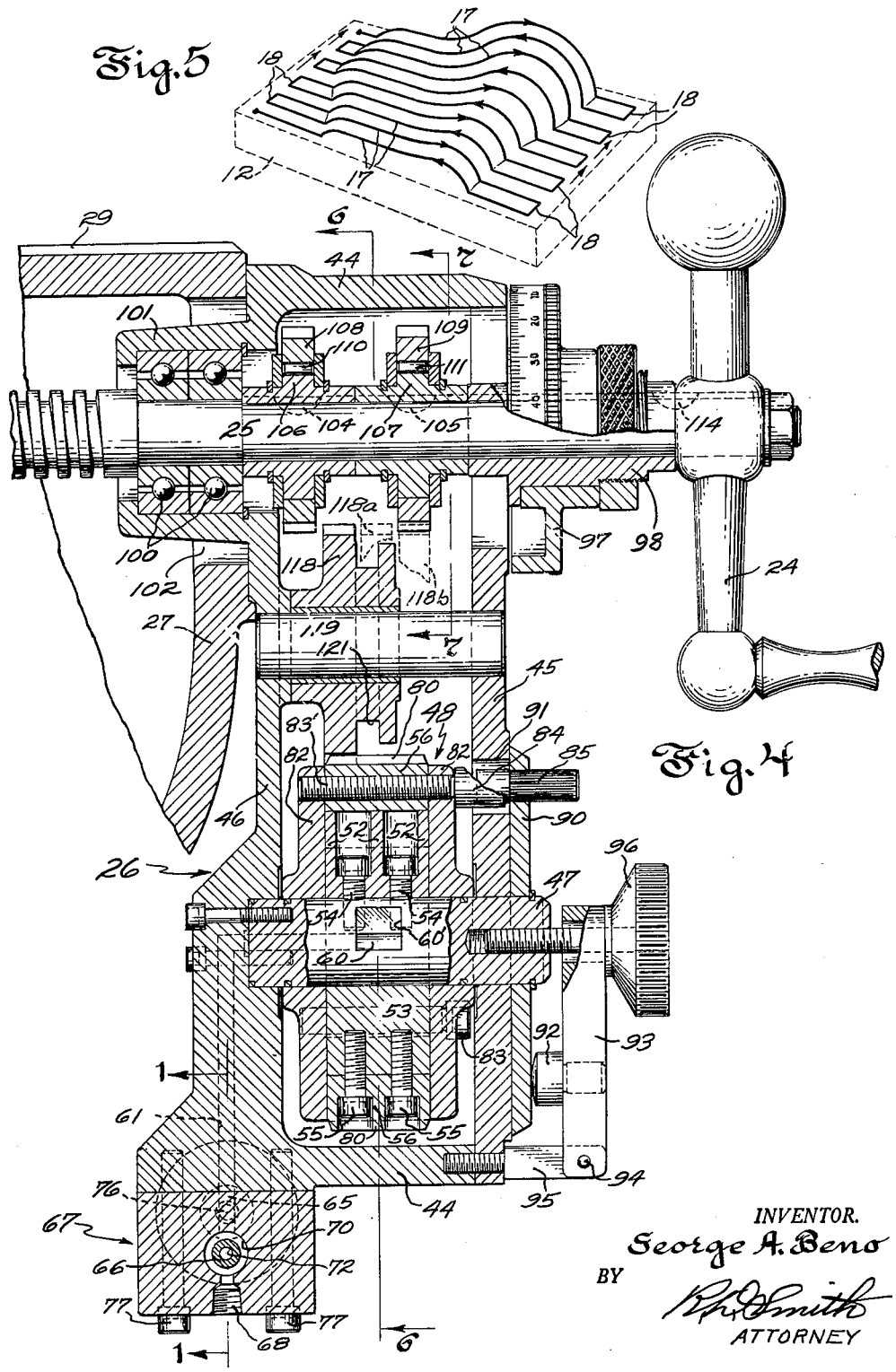

Sept. 14, 1965  G. A. BENO  3,205,781
AUTOMATIC PICK-FEED ATTACHMENT
Filed March 12, 1962  4 Sheets-Sheet 4
Fig. 10
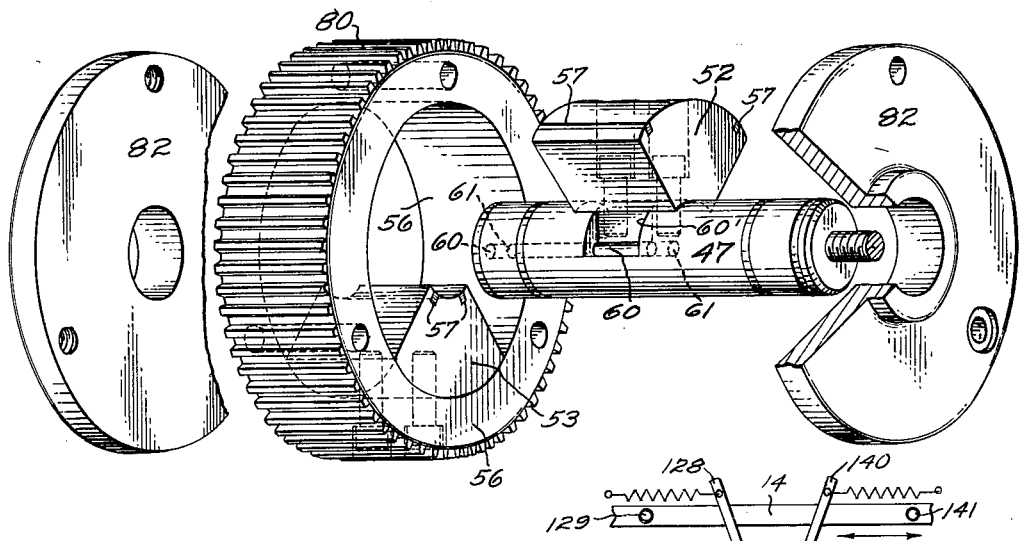
Fig. 11
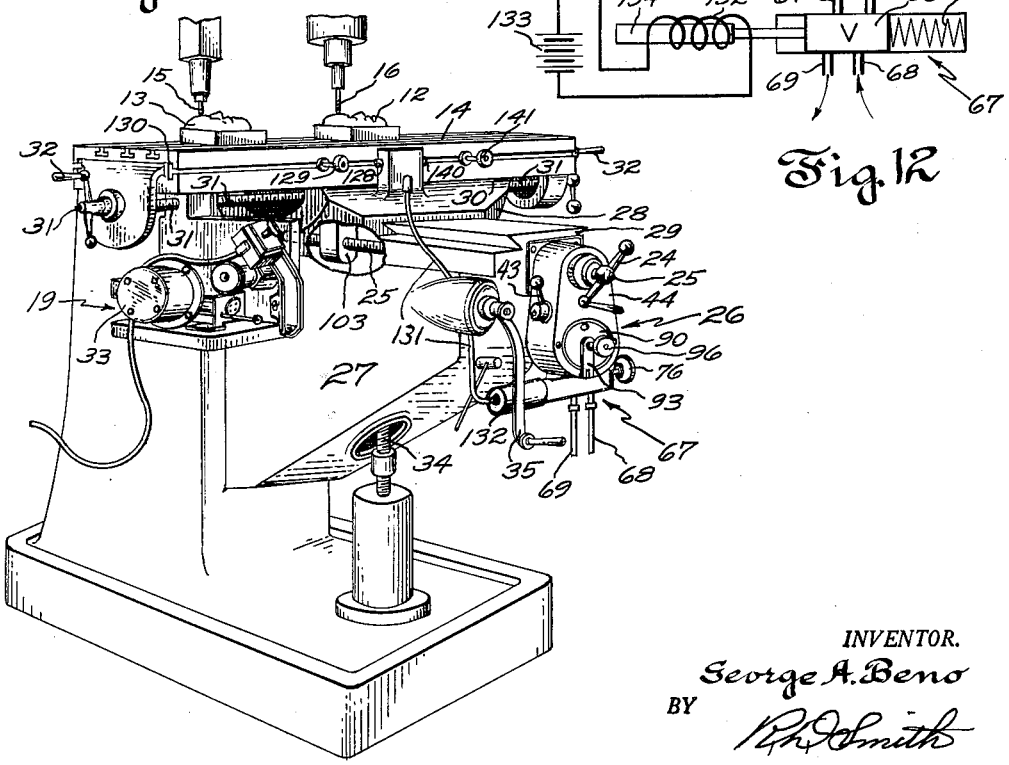
Fig. 12
INVENTOR.
George A. Beno
BY
*[signature]*
ATTORNEY United States Patent Office 3,205,781
Patented Sept. 14, 1965

3,205,781
AUTOMATIC PICK-FEED ATTACHMENT
George A. Beno, Easton, Conn., assignor to The Bridgeport Machines, Inc., Bridgeport, Conn., a corporation of Connecticut
Filed Mar. 12, 1962, Ser. No. 178,894
11 Claims. (Cl. 90—21)

This invention relates to automatic power feed attachments for machine tools such as planers or shapers or milling machines, and particularly when used for pattern duplicating where, between each of the successive passes of a workpiece in a machining path of travel, there must be an incremental advance of the work and the pattern toward the cutting tool and stylus crosswise the parallel paths in which the work travels for being progressively machined.

Such intermittent advance of the workpiece and pattern should take place only after the completion of each successive pass of the work in its cutting path and is termed the "pick-feed." Performing the pick-feed manually requires constant attendance by the operator throughout the machining operation and results in high labor cost of the work being done.

It is an object of the present improvements to accomplish pick-feed of the work, particularly in a pattern duplicating milling machine, by automatic advance of the work intermittently in a progressive direction crosswise the paths of machining travel of the work and toward the cutting tool. It is preferred to do this by means of a self-powered feeding unit that will cause pick-feed movements of, say, the saddle of a milling machine at the end of each work machining travel of the work carrying table in directions perpendicular to the pick-feed, and for this purpose to mount the feeding unit detachably on the knee of the milling machine so as to turn the feed screw of the saddle intermittently while leaving such feed screw also free to be turned by hand.

As an alternative, the automatic pick-feed may be imparted to the work table at the end of each machining pass of the saddle when the latter is arranged to cause the work to be machined, and in such case to mount the pick-feed power unit detachably on the saddle of the milling machine so as to turn the feed screw of the work table intermittently.

A further object is to effect the pick-feed movements by means of a hydraulic motor of the oscillatory type whose saddle shifting, intermittent oscillations are initiated by electric limit switches actuated by work machining travel of the worktable at preset points in its travel. By the use of such type of hydraulic motor the only electrical equipment required is such as is capable of controlling a hydraulic valve to determine the movements of the hydraulic motor. A hydraulic prime mover has the great advantage of being simple, compact and relatively low in cost in contrast to elaborate types of electrical systems making use of electrical prime movers heretofore proposed for effecting pick-feed in the types of machine tools concerned.

A successful embodiment of the invention is explained in fuller particular in the following description having reference to the appended drawings wherein:

FIG. 1 is a front view of a hydraulically motorized attachment for automatically and intermittently turning the feed screw of a work carrying part in a milling machine or analagous machine tool for causing pick-feed of the work carrier at the end of each machining pass thereof, a valve distributing liquid to the motor being shown in section on the plane 1—1 in FIG. 4.

FIG. 2 is a similar view of the fluid distributing valve in shifted position.

FIG. 3 is a fragmentary view of a direction reversing gear system housed by the attachment casing of FIG. 1 and is taken in section on the plane 3—3 in FIG. 6 looking in the direction of the arrows.

FIG. 4 is a view taken in section on the plane 4—4 in FIG. 1 looking in the direction of the arrows. See also FIG. 8.

FIG. 5 is a diagrammatic view explanatory of the function of a pick-feed in the milling of a workpiece so as to generate therein contours duplicating those of a three dimensional pattern.

FIG. 6 is a view taken in section on the plane 6—6 in FIG. 4 looking in the direction of the arrows.

FIG. 7 is a fragmentary view taken in section on the plane 7—7 in FIG. 4 looking in the direction of the arrows.

FIGS. 8 and 9 are views of a hydraulic motor like that in FIG. 6 showing vanes of the motor in different positions.

FIG. 10 is an exploded pictorial view of parts of the hydraulic motor of FIGS. 4, 6, 8 and 9.

FIG. 11 is a pictorial view of work carrying parts of a conventional milling machine equipped with the present improvements.

FIG. 12 is a diagram of electric circuit connections by which the hydraulic valve of FIGS. 1 and 2 is automatically governed.

FIG. 11 represents a pattern duplicating milling machine in which 12 is a workpiece and 13 is a pattern, both being secured fixedly on the work table 14 to travel in unison. The machining travel of the work table is lengthwise from left to right and back again in FIG. 11 so that during such travel a stylus 15 will sense the three dimensional contours of the pattern 13. Conventional apparatus, not shown, will raise and lower the rotary cutter 16 of the milling machine in relation to the workpiece in accordance with the raising and lowering of the stylus 15 in its tracing of the bas relief contour of the pattern.

There is diagrammatically represented in FIG. 5 the parallel uniplanar paths 17 across the workpiece that are caused to be traversed by the cutter during a lengthwise machining pass of the work table and also the increments 18 of intermittent advance of the workpiece toward the cutter 16 in directions perpendicular to such machining paths comprising the pick-feed movements that are accomplished by the power attachment 26 embodying these improvements.

According to the preesnt invention the pick-feed movement of the work table, which might be produced by the conventional crank handle 24 of the feed screw 25, is produced intermittently at proper times by a hydraulically motivated power attachment designated 26 as a whole which is supported from and secured to the knee 27 of the milling machine so as to operate the feed screw 25 of the saddle automatically. In conventional manner knee 27 guides the saddle 28 in directions crosswise the lengthwise travel of work table 14 by means of the dovetail way 29 on the knee, and the saddle guides the work table in the latter's lengthwise direction of travel by means of ways 30. Work table 14 is fed lengthwise along the saddle ways 30 in conventional manner by the table carried feed screw 31 that can be turned manually by the crank handle 32. Or in a modification of the present disclosure the table can be motor operated by any suitable power feed 33, as for instance that disclosed in a copending application Serial No. 168,728, filed January 25, 1962 owned by the assignee of the present application. The knee 27 can be raised and lowered in conventional manner by means of the conventional jack screw 34 which through conventional gearing is turned by the crank handle 35.

A hydraulically motorized and electrically controlled pick-feed attachment 26 that embodies the present invention may be constructed as shown in detail in the drawings.

FIG. 1 shows the front face of the self-powered pick-feed attachment that confronts the operator when standing in normal position at the front of the milling machine. It is seen to present two control handles of which the saddle feeding handle 24 is one, while the other is a swingable handle 43 which by shifting will reverse the direction in which saddle feed screw 25 becomes automatically turned in increments to accomplish the aforesaid pick-feed. The casing 44 of attachment 26 has a front wall 45 and a rear wall 46 in which walls is fixedly lodged a stationary bearing rung 47 that spans the space from front wall to rear wall. Supported on and rotatable about the rung 47 there is a hollow barrel structure 48 which constitutes the rotatably driven part of the oscillatory hydraulic motor of the present improvements. The motor includes a stationary vane 52 and a moveable vane 53, the former being fixedly secured to rung 47 by bolts 54 while the latter is fixedly secured to the barrel 48 by bolts 55 and turns with the barrel. Each of vanes 52 and 53 are block-like bodies occupying the entire width of the space within the barrel 48. The stationary vane 52 has a conforming sliding fit with respect to the inner surface of the cylindrical wall 56 of the barrel and the vane 53 conforms to and has a sliding fit against the periphery of the stationary rung 47. The said fits are such that there can be little or no escape of the liquid from the space at one side to the space at the other of either of the vanes 52 and 53. Thus any differential of hydraulic pressure existing in the two spaces separated by the moveable vane 53 will be sustained to all practical purposes for the working requirements of the motor as hereinafter described. Leakage of the pressure liquid past either vane is further inhibited by glands 57.

Dual passageways 60 and 61 serve alternately as inlet and outlet for liquid forced into and out of the hydraulic motor. Passageway 60 communicates constantly with the liquid chamber 62 at the left side of FIGS. 6, 8 and 9, while passageway 61 communicates constantly with chamber 63 at the right side. Both passageways extent horizontally side by side through the bearing rung 47 and terminate respectively at lateral notches 60' and 61' cut in the rung and having free communication with the chambers 62 and 63 respectively. From the rung 47 the passageways 60 and 61 lead downward respectively to separate vents 64 and 65 through the cylinder wall of a hydraulic distributing valve 67 through which liquid passes to and from the control piston 66 of the valve. The cylinder of valve 67 is secured to attachment casing 44 by bolts 77.

Valve piston 66 is so constructed that either vent 64 or 65 can receive and admit therethrough pressure liquid supplied at an inlet 68 in the wall of the valve cylinder in one axial position of the piston 66, and can deliver such pressure liquid to a selected one of vents 64 or 65. Simultaneously the other of said vents will be opened through piston 66 to a liquid discharge opening 69 through the cylinder wall. Thus when the valve piston is positioned axially as in FIG. 1 pressure liquid from inlet 68 will be fed to the annular valve port 70 and thence only to vent 65 thence through passageway 61 to liquid chamber 63. When the piston is positioned as in FIG. 2 pressure liquid will be fed through the same piston port 70 only to vent 64 thence through passageway 60 to liquid chamber 62. In FIG. 1 the liquid discharges from chamber 62 through piston port 71 and the cylinder outlet 69, the liquid also at this time occupying the elongate core space 72 of the piston but finding no outlet therefrom because the narrow annular port 73 of the piston, which opens to the core space at 74, is blocked by the solid walls of the cylinder. In FIG. 2 the liquid discharges from chamber 63 through piston port 73 which opens at 74 into the core space thence to piston port 71 through the opening 75 and thus to the outlet 69 in the cylinder wall. The rate of flow of liquid through vent 65 and hence to and/or from the motor chambers can be modulated in obvious manner by the needle valve 76.

Rotary barrel 48 carries spur gear teeth 80 on its periphery which teeth may be integral with the aforesaid cylindrical wall 56 of barrel 48 against whose opposite faces the web walls 82 of the barrel are clamped by bolts 83. One of these bolts 83' has its head 84 extended beyond the web wall of the barrel toward the right in FIG. 4 to encounter in its revolving travel a stop stud 85 that limits the degree of rotary movement permitted to barrel 48.

Stop stud 85 is presettable at selected points in a circle about the bearing rung 47 by its mounting in a disc 90 which swivels on a projecting end of the rung 47 that projects outside the front housing wall 45 of the attachment. Disc 90 can be turned by using stud 85 as a handle to place the stop stud 85 adjustably in various angular positions within an arcuate slot 91 in the front wall 45 of the housing. The bolt head 84 also swings in this slot so as to encounter stud 85 to be arrested thereby.

Disc 90 may carry dial graduations to measure or indicate the degree of turning or circular positioning of its carried stop stud 85 and is firmly stationed or locked in selected rotary position by a pressor plug 92 carried by an arm 93 that is swingable on a pivot 94 supported on a housing projection 95. Arm 93 is forced by a screw knob 96 to swing toward the housing so as to clamp disc 90 tightly against the housing wall 45 and station the disc until its rotary position is to be changed. Conveniently the shank of screw knob 96 for this purpose threads into the end of bearing rung 47.

There remains to be described the gearing which enables barrel gear 80 of the hydraulic motor 67 to rotate the saddle feeding screw 25 in increments of pick-feed movement in a choice of directions manually determined by the control handle 43. The outwardly extending length of feed screw shaft 25 is journaled in ball bearings 100 carried in a hollow boss 101 projecting from the rear wall 46 of the attachment casing 44 inwardly of an opening 102 in the front wall of knee 27 to which front wall the casing 44 of attachment 26 is secured by bolts 99 so as to depend externally therefrom. Screw shaft 25 extends into outboard relation to the ball bearings 100 and on its end portion carries keyed to it the crank handle 24 and the spacer hub 98 to which in conventional manner is fixed the graduated dial 97. The aforesaid saddle feeding handle 24 is keyed to screw shaft 25 by means of key 114. The side wall of knee 27 is broken away in FIG. 11 to show conventional mechanism through which feed screw 25 drives saddle 28 on knee 27 including an internally threaded lug 103 fixedly depending from saddle 28 in the hollow of knee 27 and in traveling engagement with the feed screw.

FIGS. 3, 4, 6 and 7 best show the gearing before referred to which enables barrel gear 80 to motivate the saddle feeding screw 25. On the shaft extension of this screw within the top portion of attachment casing 44 there are rotatively fixed by keys 104 and 105 the inner wheels 106, 107 respectively of one-way driving roller clutches of which the outer wheels comprise externally toothed ring gears 108, 109. In well known manner the drive of these clutches is limited respectively to relatively opposite rotary directions by the alternate binding and freeing action of rollers 110, 111 in notches 112, 113 the latter being oppositely tapered in the peripheries of the inner clutch wheels 106, 107 as shown in FIGS. 6 and 7.

Either of gears 108 and 109 alone can be driven selectively by an intermediate slide gear 118 that is freely rotatable on a stationary shaft 119 fixedly lodged in the rear wall 46 and front wall 45 of casing 44. Gear 118 can be shifted back and forth into any one of three positions 118, 118a or 118b indicated respectively by full and broken lines in FIG. 4 and in each of such positions maintains its driven mesh with the barrel gear 80 of the hydraulic motor.

In broken line position 118b in FIGS. 3 and 4, gear 118 drivingly meshes with clutch gear 109. In its position 118a indicated by broken lines in FIGS. 3 and 4, gear 118 is in mesh with no gear other than barrel gear 80 and performs no driving of the saddle feed screw. In its position shown by full lines in FIG. 3 and FIG. 4, gear 118 is in driving mesh with an idler gear 117 that is free to turn on an idler shaft 116 held stationary in the casing 44, idler gear 117 being constantly in mesh with clutch gear 108.

The shifting of gear 118 to a choice of said three positions is caused by the shifter pin 120 which engages a circumferential groove 121 in the hub of gear 118 and swings with the shifter arm 122 that is fixed on pivot shaft 123 journaled in the side wall of attachment casing 44. Pivot shaft 123 carries fixed thereon outside of casing 44 the aforesaid direction reversing handle 43 shown in FIGS. 1, 6 and 11. Handle 43 is yieldably stayed in desired angular positions by the engagement of a spring backed detent ball 124 with conforming sockets in the inner face of its hub 125.

In the operation of the improved pick-feed attachment 26 herein disclosed, it will be assumed that the work carrying table 14 can be fed lengthwise while the stylus 15 is tracing the pattern 13 and the milling cutter 16 is making a conforming machining cut on the workpiece 12 that will generate a duplicate of the contour of the pattern. Such feeding of the work table crosswise the saddle 28 of the milling machine can be produced manually by means of either of the manual crank handles 32 that turn the table feed screw 31, or can be produced automatically by a self-powered, rapid traverse unit 19 in a manner fully disclosed in the aforesaid copending application, Serial No. 168,728.

At the end of each machining pass of the work table 14 in its excursions crosswise the saddle 28, there occurs automatically an advance, incremental pick-fed of the saddle in a constant direction crosswise the direction of travel of the work table so as to cause the next pass of the work table to result in making a further machining bite into the workpiece. The action of the attachment 26 for automatically causing such pick-feed is initiated by the actuation of a normally open limit switch or switches 128, 140 by means of the projections 129, 141 that are settable at any selected positions along a T-slot 130 in the front edge of the work plate. Either of switch buttons 128, 140 will thereupon close and maintain closed an electric circuit (see FIG. 12) that energizes the solenoid 132 from any suitable source of current 133.

The core plunger 134 of the solenoid is thereupon forced toward the right thus shifting the piston 66 of hydraulic valve 67 from its position in FIG. 2 to its position in FIG. 1 and holding it there against the opposition of spring 135 as long as the solenoid remains energized. This causes liquid under pressure at valve inlet 68 to flow at a rate modulated by valve 76 through valve port 70, duct 65 and passageway 61 into motor chamber 63 in FIG. 1. At the same time liquid that has previously been confined in chamber 62 in FIG. 1 is now free to be discharged therefrom through passageway 60, duct 64, valve port 71 and valve outlet 69. Such discharge is occasioned by the swinging of valve vane 53 clockwise from its position in FIG. 1 to its position say, in FIG. 8, where it becomes arrested because the revolving stop 84 carried by barrel 48 of the hydraulic motor encounters the stationary stop pin 85 which has been preset in its selected position along the arcuate slot 91 shown in FIG. 1. The consequent rotation of the gear teeth 80 on the barrel 48 clockwise from the position of the latter in FIG. 6 will have rotated the intermediate gear 118 counterclockwise, the idler gear 117 clockwise and the clutch gear 108 counterclockwise, whereupon the clutch roller 110 will wedge in the notch 112 of clutch wheel 106 and cause the saddle feed screw 25 to rotate sufficiently to shift the work table 14 sidewise one step near the vertical plane in which lie stylus 15 and milling cutter 16 while these tool are confined to vertical movement in unison to trace the top face of the pattern. This incremental shifting of the work table comprises the pick-feed of the work designated 18 in FIG. 5 prior to the next pass of the work in its planes of machining travel designated 17.

As the switch actuating projection 129 leaves contact with limit switch operating button 128 at the start of the said next machining pass of the work, the switch is closed to break the circuit 131 thus causing solenoid 132 to become deenergized whereupon the spring 135 in the hydraulic valve restores valve piston 66 to its position in FIG. 2. This places under pressure the liquid in chamber 62 and relieves from pressure the liquid in chamber 63. The latter has become freed for discharge through passageway 61, duct 65, valve port 73, opening 74, core space 72, opening 75, valve port 71, and the discharge outlet 69. Thereupon vane 53 of the hydraulic motor will return counterclockwise to its position in FIG. 1, but the consequent turning of gears 80, 118, 117 and 106 will not cause any turning of the saddle feed screw 25 owing to the non-binding action of clutch roller 110.

At the end of the now ensuing work machining pass of work table 14 the limit switch operating button 140 will be actuated by the table carried projection 141 in a manner to again energize the solenoid 132, whereupon another pick-feed of the saddle in the same progressive direction as before will be caused by the hydraulic motor 67 as described above and prior to the next work machining pass of the work table.

In the above described automatic action of the improved pick-feed attachment the gear 108 will remain idle, it being brought into action only when the direction of the pick-feed needs to be reversed. Such reversal of direction of the pick-feed is occasioned by manually throwing the handle 43 in proper direction to cause shifter pin 120 to slide the intermediate gear 118 along its shaft 119 out of mesh with idler pinion 117 and into mesh with clutch gear 108. This, as evident from FIG. 7 and in contrast to FIG. 1, will enable the saddle feed shaft 25 to be driven incrementally only clockwise instead of counterclockwise because of the reverse disposition of the taper in the clutch notch 113. It further will be observed in FIGS. 3 and 4 that the intermediate gear 118 can be shifted to a neutral position 118a indicated by broken lines wherein the action of the hydraulic motor will cause no pick-feed turning of saddle feed screw 25 because the intermediate gear 18 is not in mesh with either the idler gear 117 or the gear 108. The chosen gear shifting position of handle 43 will be sensed and maintained by the detent ball 124.

The aforesaid copending application, Serial No. 168,728, discloses that the table feed screw 31 may be turned by the before mentioned electric motor 33 of the power unit 19 which is fixed on and depends from the saddle 28. Also that the speed of table feeding movement can be varied to cause rapid traverse of the table between positions thereon in which spaced apart portions of the work are acted upon by the milling cutter 16. Also that such variation of speed can be caused by merely reversing the direction of running of motor 33. If desired, travel of table 14 as powered by motor 33 can be reversed and/or varied as to speed by suitable circuit switching means within the ability of an electrician to supply and which may cooperate with the circuit controlling action of switch buttons 128, 140 when the latter are actuated by the adjustable limit projections 129, 141 on table 14. Thus the table if power driven in its paths of machining travel can automatically be stopped by limit switches in conventional manner before each pick-feed movement of the saddle 28 takes place and can be restarted in reverse direction for a return journey upon completion of the pick-feed movement.

It has been mentioned in the foregoing that the pick-feed attachment 26 might be applied to the table feed screw 31 and that the saddle feed screw 25 might convey the work in its machining paths of travel. Within the principles of the present invention many such variations of the shapes and arrangements of parts herein chosen to illustrate an operative embodiment of the improvements are possible, wherefore the patent solicited is intended to cover all such variations as come within a broad interpretation of the wording of the claims.

I claim:

1. In a machine tool, a pick-feed power unit for intermittently advancing work step by step toward a machining tool between successive passes of the work in parallel paths of machining travel comprising, a work carrier, means to reciprocate said carrier in successive paths of work machining travel, a feed screw operatively related to said carrier to move the latter crosswise said paths of machining travel, a fluid motor, a reciprocative power output member comprising an externally gear toothed hollow barrel driven by said motor in alternately opposite rotary directions, power transmitting means operatively connecting said toothed hollow barrel drivingly to said feed screw, and a one-way clutch operative to defeat transmission of power from said barrel to said feed screw in only one of said directions, whereby reciprocative movements of said barrel will cause unidirectional movements of said work carrier crosswise said paths of machining travel to produce pick-feed of the work.

2. In a machine tool a pick-feed power unit as defined in claim 1, in which the said fluid motor includes a fluid impulsed vane mounted to oscillate in unison with said externally gear toothed hollow barrel within the hollow thereof whereby to impel said barrel in either of opposite rotary directions, a source of pressure fluid, and a fluid distributing valve receptive to said pressure fluid and having conduit connections to the hollow of said barrel operative to deliver pressure fluid alternatively to opposite sides of said vane.

3. In a machine tool, a pick-feed power unit as defined in claim 1, in which the said power transmitting means includes an additional one-way clutch operative to defeat transmission of power from the said barrel to the said feed screw in the other of the said opposite rotary directions, together with means to disable either one of the said clutches alone whereby to prevent transmission of power in either of said rotary directions.

4. In a machine tool, a pick-feed power unit as defined in claim 3, wherein the said hollow barrel is toothed to form a driving spur gear, and the said one-way clutches include individually driven spur gears, together with an intermediate gear constantly in mesh with said driving spur gear mounted to be shiftable from a position for driving either of said driven spur gears to a position for driving the other of said spur gears.

5. In a machine tool, a pick-feed power unit as defined in claim 2, in which the said fluid impulsed vane is united with said gear toothed barrel and located in the hollow thereof.

6. In a machine tool, a pick-feed power unit as defined in claim 5, together with housing structure the enclosing said hollow wheel detachably stationed on the said machine tool, a wall of said housing structure flanking said hollow barrel having an arcuate slot, a projection extending laterally from said barrel toward said wall, a limit dial rotatably adjustable on the outside of said wall, a stop stud carried by said dial in the rotary path of said projection, and means to stay said limit dial in selected positions within the arcuate extent of said slot, whereby to limit the arcuate extent of travel of said projection at predetermined points along said slot.

7. In a machine tool, a pick-feed power unit as defined in claim 6, wherein the said projection occupies and rides in the said slot.

8. In a machine tool, a pick-feed power unit as defined in claim 6, wherein the said stop stud occupies and is adjustable along the said slot.

9. In a machine tool, a pick-feed power unit for intermittently advancing work step by step toward a machining tool between successive passes of the work in parallel paths of machining travel comprising a work carrier, means to reciprocate said carrier in successive paths of work machining travel, a feed screw operatively related to said carrier to move the latter crosswise of said paths of machining travel, a fluid motor, a reciprocative power output member comprising an externally gear-toothed hollow barrel driven by said motor in alternately opposite rotary directions, power transmitting means operatively connecting said toothed hollow barrel drivingly to said feed screw including a one-way clutch operative to defeat transmission of power from said barrel to said feed screw in only one of said directions whereby reciprocative movements of said barrel will cause unidirectional movements of said work carrier crosswise said paths of machining travel to produce pick-feed of the work, said fluid motor including a fluid impulsed vane surrounded by said barrel and mounted to oscillate in unison therewith within the hollow thereof whereby to impel said barrel in either of opposite rotary directions, a source of pressure fluid, a fluid distributing valve receptive to said pressure fluid and having conduit connections to the hollow of said barrel operative to deliver pressure fluid alternatively to opposite sides of said vane, an electrical prime mover mechanically connected to said distributing valve to actuate the latter, an electric circuit including said prime mover, circuit controlling switch means operable by movement of said work carrier at predetermined point in said paths of work machining travel whereby impulsing of said motor vane is initiated by arrival of said work carrier at said points in its said travel, a stationary vane surrounded by said hollow barrel, housing structure surrounding both said hollow barrel and said feed screw detachably stationed on the machine tool, and a bearing rung stationed in said housing structure affording pivotal support for the said fluid impulsed vane.

10. In a machine tool, a pick-feed power unit as defined in claim 9, in which the said bearing rung fixedly carries the said stationary vane.

11. In a machine tool, a pick-feed power unit as defined in claim 9, in which at least one of adjoining faces of the said fluid impulsed vane and the said stationary vane is inclined with respect to a truly radial plane of the said hollow barrel, whereby to insure the continuance of chamber space between said faces when closed together.

References Cited in the file of this patent

UNITED STATES PATENTS

| 2,309,637 | 2/43 | Fickett et al. | 90—21.5 |
| 2,360,671 | 10/44 | Haas et al. | 90—21 X |
| 2,967,463 | 1/61 | Jensen | 90—13.5 |

FOREIGN PATENTS

| 26,444 | 1902 | Great Britain. |
| 288,754 | 4/28 | Great Britain. |

WILLIAM W. DYER, Jr., *Primary Examiner.*